US008988193B2

(12) United States Patent
Bauchot et al.

(10) Patent No.: US 8,988,193 B2
(45) Date of Patent: *Mar. 24, 2015

(54) METHOD AND APPARATUS FOR LOCATING TIRES USING RFID

(75) Inventors: Frederic Bauchot, Saint-Jeannet (FR); Jean-Yves Clement, Saint-Jeannet (FR); Gerard Marmigere, Drap (FR); Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/348,545

(22) Filed: Jan. 5, 2009

(65) Prior Publication Data
US 2009/0121840 A1 May 14, 2009

Related U.S. Application Data

(63) Continuation of application No. 11/408,416, filed on Apr. 20, 2006, now Pat. No. 7,474,214.

(30) Foreign Application Priority Data

Jun. 22, 2005 (EP) .................................... 05015561

(51) Int. Cl.
*H04Q 5/22* (2006.01)
*G08C 19/12* (2006.01)
*B60C 23/00* (2006.01)
*B60C 23/04* (2006.01)

(52) U.S. Cl.
CPC ................................ *B60C 23/0416* (2013.01)
USPC .................... 340/10.1; 340/10.32; 340/10.42; 340/13.26; 340/13.28; 340/442

(58) Field of Classification Search
USPC ...................................................... 340/572.1
See application file for complete search history.

(56) References Cited

U.S. PATENT DOCUMENTS

| 6,340,930 | B1 | 1/2002 | Lin |
| 6,571,617 | B2 | 6/2003 | Van Nickerk et al. |
| 6,668,636 | B2 | 12/2003 | Nantz et al. |
| 6,691,567 | B2 | 2/2004 | Walker et al. |
| 6,693,522 | B2 | 2/2004 | Tang et al. |

(Continued)

OTHER PUBLICATIONS

Burgard et al.; Mapping and Localization with RFID Technology; IRS-TR-03-014, Intel Research, 2003.

(Continued)

*Primary Examiner* — Jennifer Mehmood
*Assistant Examiner* — John Mortell
(74) *Attorney, Agent, or Firm* — Schmeiser, Olsen & Watts, LLP; John Pivnichny

(57) ABSTRACT

A method and apparatus for determining the position of four tires on corresponding four wheels in a vehicle. Each wheel has an axis of rotation. Each tire has an embedded Radio Frequency IDentification (RFID) tag. The RFID tags embedded in the four tires have respective identifiers denoted as ID1, ID2, ID3, and ID4. A position to place a reader antenna is determined and the reader antenna is subsequently placed in the determined position. The reader antenna in the determined position emitting N signals to the respective RFID tag in the four tires. A delay is measured for receiving each signal reflected from the RFID tags. Which wheel of the four wheels each tire is on is identified according to the measured delays.

18 Claims, 4 Drawing Sheets

(56) References Cited

U.S. PATENT DOCUMENTS

| | | |
|---|---|---|
| 6,696,935 B2 | 2/2004 | Bonardi et al. |
| 6,725,712 B1 | 4/2004 | King et al. |
| 6,788,193 B2 | 9/2004 | King et al. |
| 7,010,968 B2 | 3/2006 | Stewart et al. |
| 7,168,306 B2 | 1/2007 | Hayashi |
| 7,177,739 B2 | 2/2007 | Kuchler |
| 7,180,409 B2 | 2/2007 | Brey |
| 7,265,660 B2 | 9/2007 | Watanabe |
| 7,474,214 B2 * | 1/2009 | Bauchot et al. ............ 340/572.1 |
| 7,509,834 B2 | 3/2009 | Bauchot et al. |
| 7,827,846 B2 | 11/2010 | Bauchot et al. |
| 2002/0116992 A1 | 8/2002 | Rickel |
| 2005/0192727 A1 * | 9/2005 | Shostak et al. .................. 701/37 |
| 2006/0042734 A1 | 3/2006 | Turner et al. |
| 2006/0090558 A1 | 5/2006 | Raskas |
| 2006/0124214 A1 | 6/2006 | Bauchot et al. |
| 2009/0121840 A1 * | 5/2009 | Bauchot et al. ............... 340/10.1 |
| 2009/0205405 A1 | 8/2009 | Bauchot et al. |

OTHER PUBLICATIONS

Project Co-ordinator: Technical Research Centre of Finland (VTT), Intelligent Tyre Systems—State of the Art and Potential Technologies, APOLLO, IST-2001-34372, Intelligent Tyre for Accident-free Traffic, Report Preparation Date: May 22, 2003, 108 pages.

* cited by examiner

METHOD AND APPARATUS FOR LOCATING TIRES USING RFID

This application is a continuation application claiming priority to Ser. No. 11/408,416, filed Apr. 20, 2006.

FIELD OF THE INVENTION

The present invention relates generally to a method and system for monitoring tires (wear, pressure, temperature, . . . ) and more specifically to a method and system for wirelessly locating tires, using Radio Frequency IDentification (RFID) tags.

BACKGROUND OF THE INVENTION

Because the tires are the only points of contact between a vehicle and the road, tires are one of the most crucial safety components in the vehicle, for all types of vehicles, such as cars, trucks, sport utility vehicles, off-road vehicles, airplanes, motorcycles, bicycles, mobile industrial and construction equipment, and the like. Tires are responsible for how the vehicle responds to the driving and steering. To optimize the effects of the tires on the road and therefore, to provide for safety of the vehicle, the inflation pressure of tires must be kept within the manufacturer's prescribed range. Tires that are driven under-inflated generate excessively high heat levels that can weaken the tire to the point of failure. At high speed, a rapidly deflating tire can cause loss of vehicle control. An over-inflated tire will result in harsh ride quality and can cause uneven tire wear. Furthermore, operating a vehicle with over- or under-inflated tires increases both fuel consumption and the exhaust emissions produced by the vehicle.

Tires are designed to grip the road, allowing the vehicle to start, stop and go around corners safely in any weather. Proper treads allow for normal handling of a vehicle and help prevent skidding and hydroplaning. Treads wear out over time. As a consequence, the distance that is required to stop a vehicle increases with the wear of tires. A recent series of tests conducted for The British Rubber Manufacturers Association by MIRA has shown that the stopping distance significantly increases and cornering performance deteriorates when tire tread depth falls below 3 mm, even if the legal minimum tread depth is 1.6 mm (generally, tire tread depth is comprised between 7 and 9 mm). So, it is extremely important to check the tire treads for signs of wear as well as tire pressure.

It is known in the automotive industry to provide for wireless monitoring of vehicle tire parameters, particularly tire pressure. In such tire pressure monitoring systems, tire pressure sensors and radio frequency transmitters are mounted inside each tire, typically adjacent the inflation valve system. In each tire, the tire pressure sensed by the tire pressure sensor is transmitted by the transmitter to a receiver/controller localized on the vehicle. The tire pressure information delivered to the receiver/controller by the radio frequency signal from the transmitters is subsequently conveyed to a vehicle operator or occupant, typically in the form of a display.

When a single reader is used to monitor several tires such operation can create problems when tires are subsequently rotated or changed from their initial locations to new locations, or when a vehicle tire is replaced. Each time the vehicle tires are rotated or a tire is replaced, initialization or sign-up must be repeated to ensure that the system continues to operate properly by conveying accurate information, including tire location, to the vehicle operator. This initialization requirement makes tire rotation more complex, and increases the possibility of inaccurate operation of the system.

U.S. Pat. No. 6,788,193 discloses a system for remote control of tire pressure in a vehicle having front tires including a right tire and a left tire, and rear tires including a right tire and a left tire, and for automatically identifying tire location. A transmitter mounted in each tire transmits a tire information signal conveying tire pressure data and associated tire rotation direction data. A vehicle mounted receiver has a location a first distance from the front tires and a second distance from the rear tires, the first distance being different from the second. A vehicle mounted controller in communication with the receiver determines whether pressure data is associated with a front tire or a rear tire based on the strength of the tire information signal, and whether pressure data is associated with a right tire or a left tire based on the associated rotation direction data.

A particular problem associated with signal processing in vehicle environment lies in the metallic structure of the vehicle that generates signal reflection and perturbation. Measuring signal strength of a signal emitted by an emitter mounted inside a tire in rotation is complex and subject to many parameters that could lead to inaccurate operation of the system.

Thus, there exists a need for an improved system and method for identifying tire location without the need of an initialization step.

SUMMARY OF THE INVENTION

Thus, it is a broad object of the invention to remedy the shortcomings described hereinabove.

It is another object of the invention to provide a method and system for wirelessly locating tires, the tires being in movement or stationary.

It is a further object of the invention to provide a method and system for wirelessly locating tires that is independent of the tire environment.

It is still a further object of the invention to provide a method and system for wirelessly locating tires that do not require any learning phase or initialization step.

According to one aspect of the invention a method is provided for determining the position of a plurality of tires having embedded Radio Frequency IDentification (RFID) tags, using at least one RFID reader antenna positioned at a predetermined distance from the plurality of tires, the distances between the RFID reader antenna and each of the tires to localize being different, the method comprises the steps of, for each identifier of RFID tags, measuring the delay required for a signal emitted by the reader antenna to be reflected by the RFID tag having the identifier, storing the measured delay if it is smaller than a previous measured delay corresponding to the identifier, repeating the step of measuring the delay required for a signal emitted by the reader antenna to be reflected by the RFID tag having the identifier until a threshold value is reached, ordering the stored delay stored for each of the RFID tags and, determining the position of each of the plurality of tires according to the predetermined distances between the RFID reader antenna and each of the plurality of tires to be localized.

According to another aspect of the invention an apparatus is provided for determining the position of a plurality of tires having embedded Radio Frequency IDentification (RFID) tags, using at least one RFID reader antenna positioned at a predetermined distance from the plurality of tires, the distances between the RFID reader antenna and each of the tires to localize being different, the apparatus comprises, an identifier of each of the RFID tags, means for measuring the delay required for a signal emitted by the reader antenna to be reflected by the RFID tag having the identifier, means for storing the measured delay if it is smaller than a previous measured delay corresponding to the identifier, means for repeating the step of measuring the delay required for a signal emitted by the reader antenna to be reflected by the RFID tag having the identifier until a threshold value is reached, means for ordering the stored delay stored for each of the RFID tags and, means for determining the position of each of the plurality of tires according to the predetermined distances between the RFID reader antenna and each of the plurality of tires to be localized.

Further advantages of the present invention will become apparent to one skilled in the art upon examination of the drawings and detailed description. It is intended that any additional advantages be incorporated herein.

DETAILED DESCRIPTION OF THE PREFERRED EMBODIMENT

Figure 1:
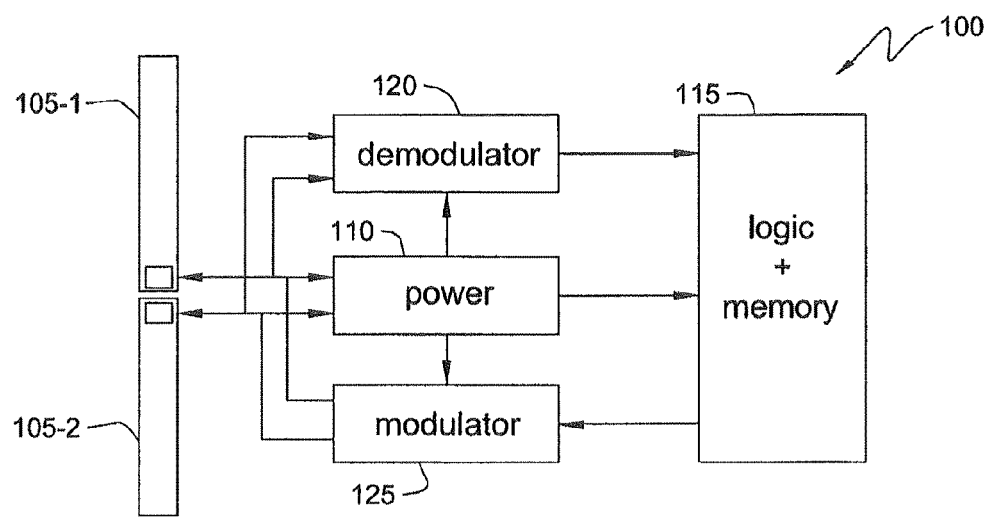
FIG. 1 depicts an example of the architecture of a passive RFID tag.

According to the invention there is provided a method and system for locating tires using embedded RFID tags, piezoelectric RFID tags or electronic RFID tags.

The core of any RFID system is the 'Tag' or 'Transponder', which can be attached to or embedded within objects, wherein data can be stored. An RFID reader, generically referred to as reader in the following description, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require battery for transmission since generally, they are powered by the reader using an induction mechanism (an electromagnetic field is emitted by the reader antenna and received by an antenna localized on the RFID tag). This power is used by the RFID tag to transmit a signal back to the reader, carrying the data stored in the RFID tag. Active RFID tags comprise a battery to transmit a signal to a reader. A signal is emitted at a predefined interval or transmitted only when addressed by a reader.

When a passive High Frequency (HF) RFID tag is to be read, the reader sends out a power pulse e.g., a 134.2 KHz power pulse, to the RFID antenna. The magnetic field generated is 'collected' by the antenna in the RFID tag that is tuned to the same frequency. This received energy is rectified and stored on a small capacitor within the RFID tag. When the power pulse has finished, the RFID tag immediately transmits back its data, using the energy stored within its capacitor as its power source. Generally, 128 bits, including error detection information, are transmitted over a period of 20 milliseconds (ms). This data is picked up by the receiving antenna and decoded by the reader. Once all the data has been transmitted, the storage capacitor is discharged, resetting the RFID tag to make it ready for the next read cycle. The period between transmission pulses is known as the 'sync time' and lasts between 20 ms and 50 ms depending on the system setup. The transmission technique used between the RFID tag and the reader is Frequency Shift Keying (FSK) with transmissions generally comprised between 124.2 kHz and 134.2 kHz. This approach has comparatively good resistance to noise while also being very cost effective to implement. Many applications require that RFID tag attached to objects be read by a readout antenna while traveling at specific speeds. With large antennas designed for Automatic Vehicle Identification (AVI), it is possible to successfully read data at read speeds of about 65 meters/second (ms), that is 234 kilometers/hour (km/H).

RFID tags can be read-only, write-once, or read-write. A read-only RFID tag comprises a read-only memory that is loaded during manufacturing process. Its content can not be modified. The write-once RFID tags differ from the read-only RFID tags in that they can be programmed by the end-user, with the required data e.g., part number or serial number. The read-write RFID tags allow for full read-write capability, allowing a user to update information stored in a tag as often as possible within the limit of the memory technology. Generally, the number of write cycles is limited to about 500,000 while the number of read cycles is not limited. A detailed technical analysis of RFID tag is disclosed e.g., in RFID (McGraw-Hill Networking Professional) by Steven Shepard, edition Hardcover.

FIG. 1 depicts an example of the architecture of a passive High Frequency (HF) or Ultra High Frequency (UHF) RFID tag 100. As shown, a dipole antenna comprising two parts 105-1 and 105-2 is connected to a power generating circuit 110 that provides current from a received signal to the logic and memory circuit 115, to the demodulator 120, and to the modulator 125. The input of demodulator 120 is connected to the antenna (105-1 and 105-2) for receiving the signal and for transmitting the received signal to logic and memory circuit 115, after having demodulated the received signal. The input of modulator 125 is connected to logic and memory circuit 115 for receiving the signal to be transmitted. The output of modulator 125 is connected to the antenna (105-1 and 105-2) for transmitting the signal after it has been modulated in modulator 125.

The architecture of a semi-passive RFID tag is similar to the architecture represented in FIG. 1, the main difference being the presence of a power supply that allows it to function with much lower signal power levels, resulting in greater reading distances. Semi-passive tags do not have an integrated transmitter like active tags. Active tags comprise a battery and an active transmitter allowing generation of high frequency energy applied it to the antenna.

As disclosed in "A basic introduction to RFID technology and its use in the supply chain", White Paper, Laran RFID, when the propagating wave from the reader collides with tag antenna in the form of a dipole, part of the energy is absorbed to power the tag and a small part is reflected back to the reader in a technique known as back-scatter. Theory shows that for the optimal energy transfer the length of the dipole must be equal to half the wave length, or $\lambda/2$. Generally, the dipole is made up of two $\lambda/4$ lengths. Communication from tag to reader is achieved by altering the antenna input impedance in time with the data stream to be transmitted. This results in the power reflected back to the reader being changed in time with the data i.e., it is modulated. As a consequence, the distance between the reader and the tag can be estimated by determining the time required for a signal to be received by the reader after being emitted.

Figure 2A:
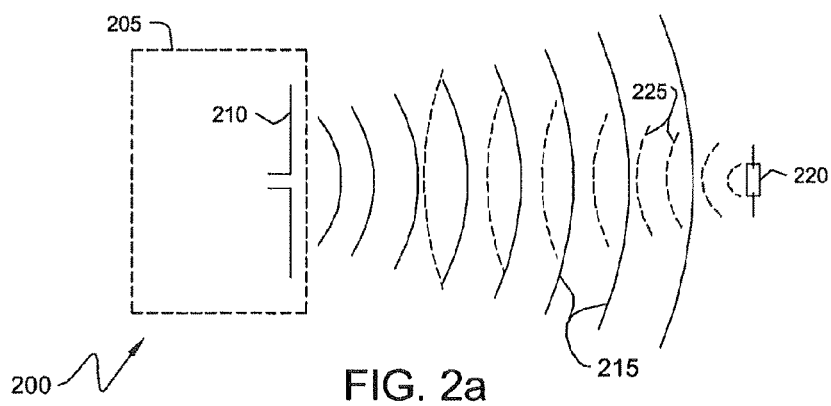
FIG. 2a shows an RFID system with a reader having an antenna and an RFID tag having a dipole antenna.
Figure 2B:
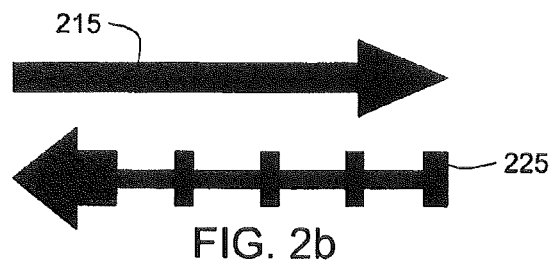
FIG. 2b illustrates the signal emitted by the antenna of the reader and the modulated signal reflected by the RFID tag.

FIGS. 2*a* and 2*b* show an RFID system 200. As depicted on FIG. 2*a*, RFID system 200 comprises a reader 205 having an antenna 210. Antenna 210 emits a signal 215 that is received by an RFID tag 220. Signal 215 is reflected in RFID tag 220 and re-emitted as illustrated with dotted lines referred to as 225. FIG. 2*b* illustrates a representation of signal 215 emitted by antenna 210 of reader 205 and a representation of signal 225 reflected by RFID tag 220. The reflected signal 225 is modulated.

Figure 3:
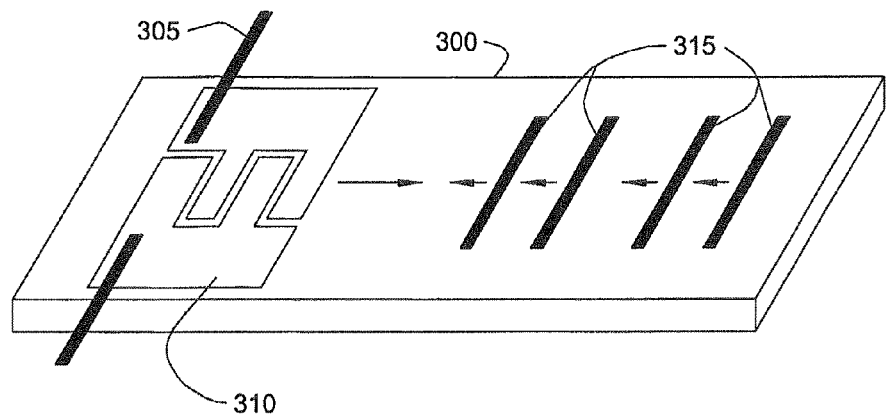
FIG. 3 depicts a surface acoustic wave RFID tag.

A different class of RFID tags, also known as piezoelectric, comprises Surface Acoustic Wave (SAW) RFID tags that use different physical principles based upon acoustic wave reflection. As shown in FIG. 3, a SAW RFID tag 300 comprises an antenna 305, an InterDigital Transducer (IDT) 310 and reflectors generically referred to as 315. SAW RFID tag 300 converts a radio wave received from antenna 305 in surface acoustic wave pulses in IDT 310. The acoustic wave travels past the set of wave reflectors 315 to produce uniquely encoded acoustic wave pulses which travel back to IDT 310, as shown on FIG. 3 with arrows. In turn, IDT 310 converts the acoustic wave pulses into an encoded radio wave signal. The SAW RFID tags operate using the piezoelectric effect and do not require electrical power except for the electrical power from the incident radio wave.

Figure 4:
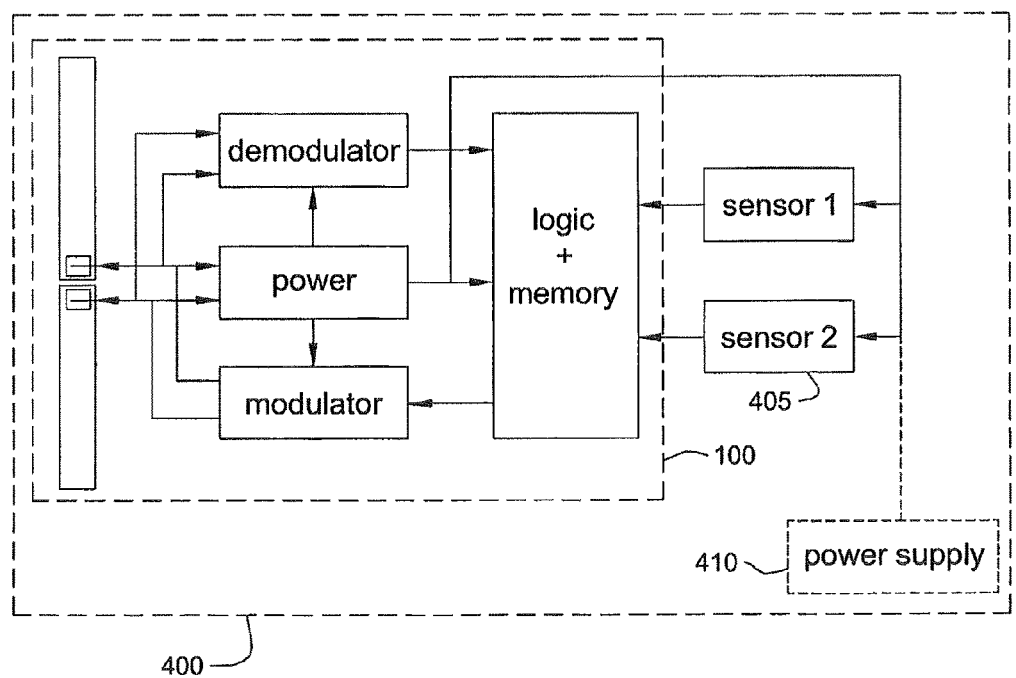
FIG. 4 represents the architecture of an RFID tag, similar to the architecture of FIG. 1, that further comprises two sensors e.g., thermal or pressure sensor, and an optional power supply so that measured data can be stored in the tag memory.

According to the system of the invention, a single reader antenna can be used in a vehicle (motorcycles, cars, trucks, planes, . . . ) for locating tires embedding piezoelectric tags or electronic RFID tags (passive, semi-passive, or active HF or UHF RFID tags), possibly adapted to transmit data relative to the tires e.g., identifier, temperature, pressure, and/or wear. To that end, the RFID tags can comprise sensors and power supply (if required) as shown in FIG. 4. The architecture of the electronic RFID tag 400 is similar to the one discussed by reference to FIG. 1 and further comprises at least one sensor, generically referred to as 405, and optionally a power supply 410 so as to enable the sensor to measure data that can be either directly transmitted to the reader or stored in the RFID tag memory to be transmitted later to the reader, as suggested with dotted lines. Power supply 410 can consist of either a battery, a power generator, or a combination of both. Sensors 405 can be, for example, thermal sensors or pressure sensors, known to the one skilled in the art. Piezoelectric sensors can be used to reduce, or avoid, the need of electrical power.

The use of piezoelectric RFID tags presents some advantages in view of piezoelectric quartz properties since it is possible to monitor some tire parameters without the need of a power supply. In particular, piezoelectric quartz characteristics vary with temperature and pressure. As a consequence, the surface acoustic wave celerity is modified with variations of temperature and pressure and so, by measuring pulse phase difference with a predetermined reference, it is possible to determine temperature and pressure. Nevertheless, piezoelectric RFID tags can also be combined with other sensors.

The presence or absence of RFID tags can be used as the sensor itself (without requiring further sensors). In particular when monitoring tire wear, the RFID tag can be inserted within the rubber mix or positioned and glued within the grooves. For monitoring tire wear using RFID tags, an efficient method comprises embedding RFID tags within the tire to monitor different distances from the periphery of the tire. As long as the tire wear increases, the thickness of the rubber decreases and RFID tags are removed. By monitoring the remaining RFID tags and analyzing their signatures, one can determine tire wear. Likewise, a plurality of RFID tags can be distributed along the tire width, at approximately equivalent distance from the tire periphery, to monitor tire wear balance.

The choice of the embedded RFID tag type depends upon the tire type, upon the type of data to be monitored, the working environment, etc. For example, if the system monitors tire wear, all kinds of passive RFID tags can be used while electronic semi-passive or active UHF RFID tags, or SAW tags, are more adapted to monitor specific tire parameters. It is also possible to combine different types of RFID tags in a same tire e.g., a piezoelectric tag can be used for locating the tire while an electronic active RFID tag can be used for accessing specific data relative to the tire. However in such a case, it is necessary to establish a link between the identifier of both tags. If such link can be easily done in a link table, it is preferably done by using a common sub-identifier e.g., the n first digits of the identifiers. If RFID tags are not both embedded within the tire e.g., one is embedded within the tire while the other one is placed within the valve, one of the RFID tags can comprise a write memory so as to copy the sub-identifier of the other one.

Figure 5:
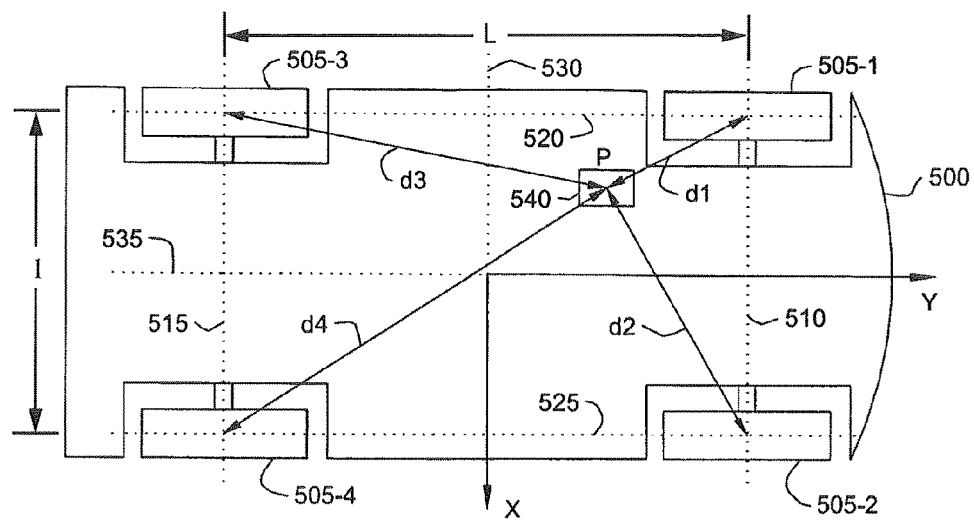
FIG. 5 is a schematic of a vehicle comprising wheels with tires having embedding RFID tags and an RFID reader with a single antenna adapted to monitor tires and to determine the position of the tires.

For locating the tire, the system and method of the invention is based upon distance calculation. The reader antenna is localized at a predetermined distance from each tire, different for each tire, preferably in such a way that the rotational position of each tire does not change the distance order between the reader antenna and the tires. Each tire comprises at least one RFID tag, preferably a SAW RFID tag. FIG. 5 is a schematic of a vehicle 500 comprising four wheels 505-1 to 505-4 and a single RFID reader antenna 540. As depicted, front wheels are aligned along axis 510, rear wheels are aligned along axis 515, left wheels are aligned along axis 520, and right wheels are aligned along axis 525. The median axes 530 and 535 represent the points that are at equal distances to the front and rear wheels, and to the left and right wheels, respectively. As a consequence, the reader antenna should not be localized on axis 530 and 535 nor, preferably, at a distance from these lines less than a predetermined distance corresponding to variations of the distances when wheels are rotating.

With reference to FIG. 5, the following notations are used,
  each wheel is identified by an index varying from 1 to 4 as shown;

the position of the reader antenna is determined by reference P;

the working space is represented by a two dimensional space centered in the middle of the vehicle, as illustrated. For sake of illustration, it is assumed that distance L between rear left wheel and front left wheel is equal to the distance between rear right wheel and front right wheel; likewise, it is assumed that distance l between rear left wheel and rear right wheel is equal to the distance between front left wheel and front right wheel. As a consequence, the coordinates of the wheels and of the reader antenna can be expressed as, wheel 1 (−l/2; L/2)
wheel 2 ((l/2; L/2)
wheel 3 (−l/2; −L/2)
wheel 4 (l/2; −L/2)
reader antenna P (x; y)

considering that RFID tags are localized on the axis of the wheels, distances between the reader antenna and the RFID tags can be expressed as, $$d_1 = \sqrt{\left(x+\frac{l}{2}\right)^2 + \left(y-\frac{L}{2}\right)^2}$$

$$d_2 = \sqrt{\left(x-\frac{l}{2}\right)^2 + \left(y-\frac{L}{2}\right)^2}$$

$$d_3 = \sqrt{\left(x+\frac{l}{2}\right)^2 + \left(y+\frac{L}{2}\right)^2}$$

$$d_4 = \sqrt{\left(x-\frac{l}{2}\right)^2 + \left(y+\frac{L}{2}\right)^2}$$

considering that coordinates of reader antenna 540 are such that the abscissa is negative and the ordinate is positive and supposing that distance between rear and front wheels is greater than distance between left and right wheels, distances $d_1$, $d_2$, $d_3$, and $d_4$ must verify the following relation, $$d_1 < d_2 < d_3 < d_4$$

According to the principle of the solution, the best location of the reader antenna i.e., the best position of point P, must maximize the separation between the distances to the four wheels, that is maximizing the minimum of the values ($d_2-d_1$), ($d_3-d_2$), and ($d_4-d_3$).

Figure 6:
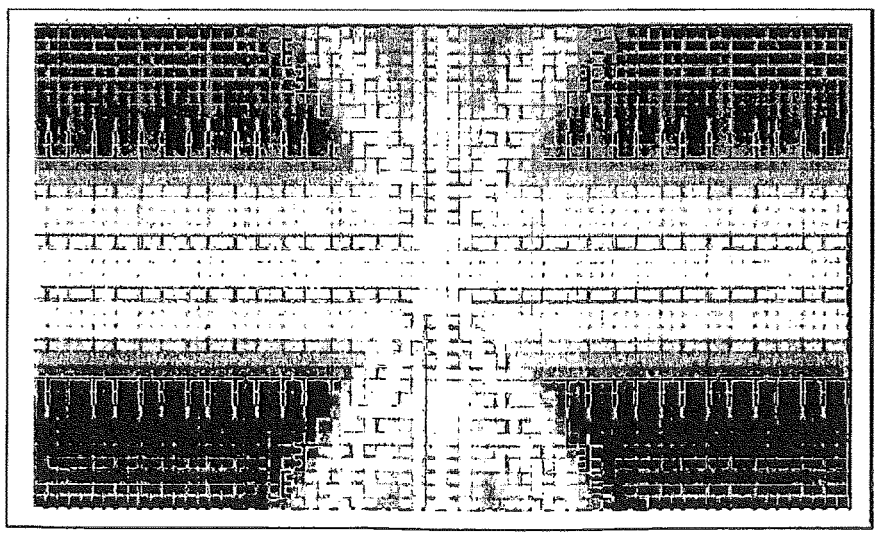
FIG. 6 illustrates the best positions for locating an RFID reader antenna within a vehicle so as to monitor tires and determine the position of the tires.

If the optimal location of the reader antenna can be mathematically determined, it can also be determined by computing the minimum value of ($d_2-d_1$), ($d_3-d_2$), and ($d_4-d_3$) when the position of reader antenna 540 is moved. FIG. 6 illustrates the variation of the minimum value of ($d_2-d_1$), ($d_3-d_2$), and ($d_4-d_3$) when the position of reader antenna 540 is moved. The darker the point color is, the greater is the minimum of the values ($d_2-d_1$), ($d_3-d_2$), and ($d_4-d_3$). Therefore, as shown on FIG. 6, the reader antenna must be as close as possible to one wheel.

Figure 7:
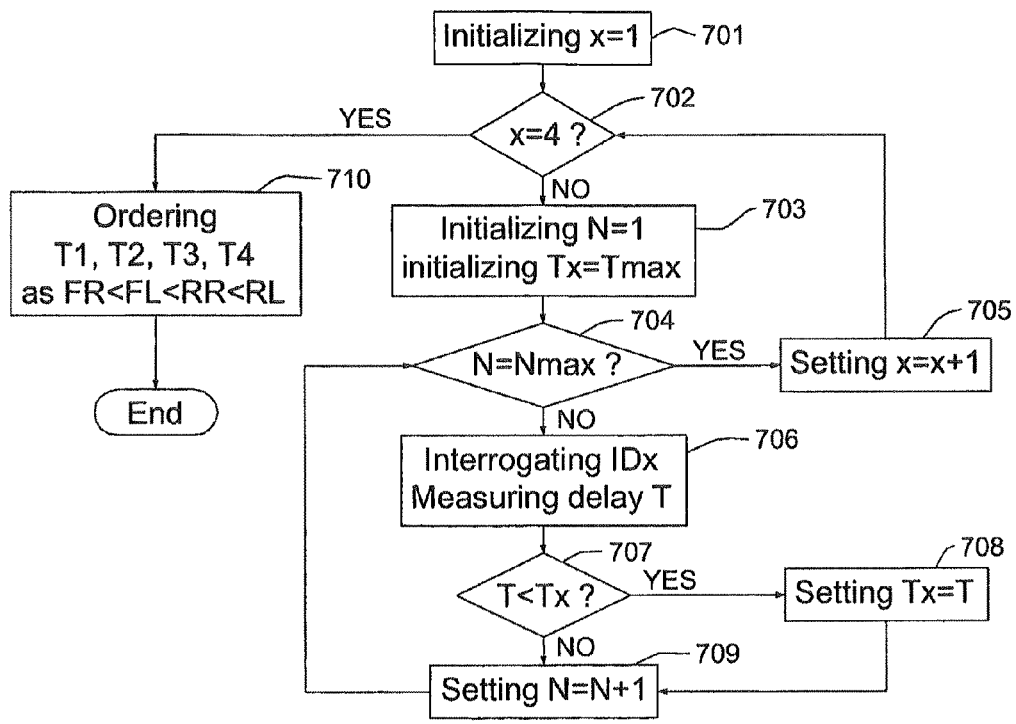
FIG. 7 depicts a block diagram example of the algorithm according to one aspect of the invention for determining the position of the wheels.

Once the position of reader antenna 540 has been determined, knowing distances $d_1$, $d_2$, $d_3$, and $d_4$ and the associated RFID tag identifier allows the determination of the RFID tag position i.e., front/rear and left/right. FIG. 7 depicts an example of an algorithm according to the invention for determining the position of the wheels. For sake of illustration, the identifier of the RFID tags embedded within tires of the four wheels are referred to as ID1, ID2, ID3 and ID4. Thus IDx denotes the identifier (for x=1, 2, 3, or 4 (of an RFID tag that is embedded in one tire in one wheel. Likewise, FL refers to front left tire, FR refers to front right tire, RL refers to rear left tire, and RR refers to rear right tire. The algorithm of FIG. 7 comprises:

step 701: the method initializes a local variable x that is set to 1. This variable is used in the following steps as an index of the current RFID tag;

step 702: a test is performed to check if the value of local variable x is found equal to 4. If it is the case, then control is given to step 710; otherwise control is given to step 703;

step 703: a first local variable N is initialized to the value 1 and a second local variable Tx is initialized to the value Tmax which is larger than any regularly observed delay for receiving an echo from an RFID tag;

step 704: a test is performed to check if the local variable N is found equal to a value Nmax. Nmax is preferably set as a predefined fixed threshold value, depending on the vehicle characteristics. If it is the case, then control is given to step 705; otherwise control is given to step 706;

step 705: local variable x is incremented by 1. Then control is given to step 702;

step 706: the RFID reader interrogates RFID tag IDx (i.e., emits a signal to the RFID tag whose identifier is IDx) and measures delay T for receiving the echoed signal reflected from the RFID tag whose identifier is IDx;

step 707: a test is performed to check if the delay T is found smaller than the local variable Tx. If it is the case, then control is given to step 708; otherwise control is given to step 709;

step 708: local variable Tx is set equal to the delay T;

step 709: local variable N is incremented by 1. Then control is given to step 704; and, step 710: four local variables T1, T2, T3 and T4 are ordered, starting from the smallest to the greatest (for instance T2<T3<T1<T4). The resulting order corresponds to the following tire identification: TFL<TFR<TRL<TRR. Then the process ends.

Determining several times the distance between the reader antenna and each RFID allows one to take into account the rotation of the wheels so as to consider only the position of the tags when these are at the closest position to the reader antenna.

Even if the system and method of the invention have been described with only one RFID tag per tire, it should be understood that each tire can embed more than one RFID tag. In such a case, determining the position of each RFID tag is similar, the only difference being that more than four distances are evaluated. However, all the distances can be grouped in four groups of equivalent distances corresponding to each of the four tire positions. Likewise, if the vehicle comprises more than four tires e.g., spare tire or trucks, all the determined distances can be ordered according to a predetermined set of distances depending upon the number of tires and their respective position according to the RFID reader antenna.

Figure 8:
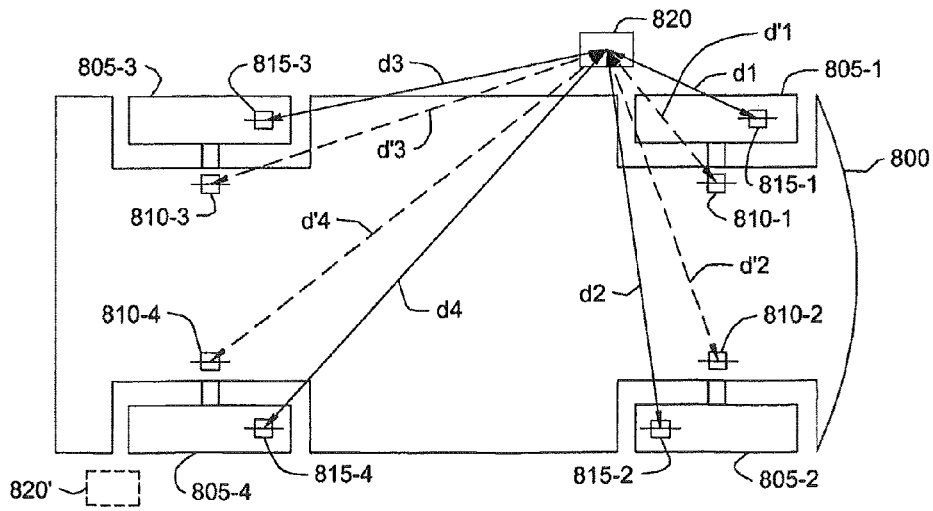
FIG. 8 is a schematic of a vehicle comprising wheels with tires having embedding RFID tags and RFID tags mounted near each wheel, characterizing the position of the wheels, adapted to be used with an RFID reader having a single antenna mounted at a fixed location, independent of the vehicle, adapted to monitor tires and determine their position.

According to the aforementioned description, the RFID reader antenna is positioned within the vehicle comprising the tires to monitor. Alternatively, the RFID reader antenna can be mounted in a fixed environment such as a garage. In such a case, marks are preferably done on the ground or elsewhere so that the vehicle can be stopped in a predetermined position such that the distances between the RFID reader antenna and the RFID tags are pre-evaluated and stored within the system linked to the RFID reader. This kind of system allows an automatic control of the tires during vehicle maintenance, refueling, etc. To avoid such marking, the vehicle can comprise predetermined RFID tags, mounted near each wheels and identifying the position of the wheels, allowing the system to determine the distance between the reader and each location of the wheels and to determine the position of the tire, wherever the RFID tags are embedded within the tires. FIG. 8 illustrates a system wherein the RFID reader antenna is mounted at a fixed location i.e., independent of the vehicle 800, and wherein RFID tags identifying wheels locations are mounted on the vehicle 800, close to the wheels. As depicted, vehicle 800 comprises four wheels 805-1 to 805-4 and four RFID tags referred to as 810-1 to 810-4, mounted on vehicle 800 and identifying the wheels. For example, the identifier of RFID tag 810-1 is LF, the identifier of RFID tag 810-2 is RF, the identifier of RFID tag 810-3 is LR, and the identifier of RFID tag 810-4 is RR. At least one RFID tag, generically referred to as 815, is embedded within the tire of each wheel e.g., RFID tag 815-1 is embedded within tire of wheel 805-1. RFID tags 810 and 815 can be of the same type or different types. To monitor the tires of vehicle 800, the system associated with reader antenna 820 begins with determining the distance d'1, d'2, d'3, and d'4 between itself and each wheel by selecting RFID tags having LF, RF, LR, and RR as identifier according to the method described by reference to FIG. 7. Then, the system associated with reader antenna 820 deselects theses RFID tags and selects the other ones and determines the distance d1, d2, d3, and d4 between itself and the selected tags. Finally, by comparing the distances determined with RFID tags having LF, RF, LR, and RR as identifier with the distances determined from the other RFID tags, the system is able to determine which RFID tags are mounted on which wheels. According to this embodiment, the system is able to monitor and localize each tire even if the reader antenna is positioned at another location e.g., location 820', the only condition being that the reader antenna is not positioned on the wheel medians as discussed above. Once again, even if only one RFID tag is embedded within each tire in the example shown on FIG. 8, more than one RFID tag can be embedded within each tire as described above. Likewise, the system can monitor more than four tires.

Still in another embodiment, more than one RFID reader antenna can be used. For example, a first reader antenna can be assigned to receive a signal from a front tire while a second reader antenna can be assigned to receive a signal from a rear tire, or a reader antenna can be assigned to a truck and a second one to its trailer. In particular, the use of several reader antennas can be advantageous when distances between reader antenna and RFID tags are greater than maximum reading distance, for example in a plane.

In order to satisfy local and specific requirements, a person skilled in the art may apply to the solution described above many modifications and alterations all of which, however, are included within the scope of the invention as defined in the following claims.

What is claimed is:

1. A method for determining the position of four tires on corresponding four wheels in a vehicle, each wheel having an axis of rotation, each tire having an embedded Radio Frequency IDentification RFID) tag, wherein the RFID tags embedded in the four tires have respective identifiers denoted as ID1, ID2, ID3, and ID4, wherein the axis of the four wheels have (X, Y) coordinates with respect to X and Y axes of a rectangular X-Y coordinate system, wherein the X and Y axes form a plane comprising the axes of the four wheels, and wherein the method comprises:
   determining a position P(x, y) to place a reader antenna subject to x<0 and y>0, wherein (x, y) denotes the (X, Y) coordinates of position P in the X-Y coordinate system;
   placing the reader antenna at the determined position P(x, y);
   after said placing and for z=1, 2, 3, and 4, said reader antenna emitting N signals to the RFID tag whose identifier is IDz and measuring a delay Tzn for receiving the signal n (n=1, 2, . . . , N) reflected from the RFID tag whose identifier is IDz, wherein N is at least 2; and
   identifying which wheel of the four wheels each tire of the four tires is on according to the measured delay Tzn for z=1, 2, 3, and 4 and n=1, 2, . . . , N,
   wherein said determining the position P(x, y) comprises maximizing a measure of a separation between the position P(x, y) and the four wheels.

2. The method of claim 1, wherein the four wheels are a front left wheel (wheel1), a front right wheel (wheel2), a rear left wheel (wheel3), and a rear right wheel (wheel4), wherein L denotes a distance between wheel1 and wheel3 and is equal to a distance between wheel2 and wheel4, wherein l denotes a distance between wheel1 and wheel2 and is equal to a distance between wheel3 and wheel4, wherein the (X, Y) coordinates on the axis of the four wheel are (−l/2, L/2) for wheel1, (l/2, L/2) for wheel2, (−l/2, −L/2) for wheel3, and (l/2, −L/2) for wheel4, wherein d1, d2, d3, and d4 respectively denote a distance between P(x, y) and the axis of wheel1, wheel2, wheel3, and wheel 4 subject to d1<d2<d3<d4, wherein $d1=((x+l/2)^2+(y-L/2)^2)^{1/2}$, $d2=((x-l/2)^2+(y-L/2)^2)^{1/2}$, $d3=((x+l/2)^2+(y+L/2)^2)^{1/2}$, and $d4=((x-l/2)^2+(y+L/2)^2)^{1/2}$, and wherein the measure of the separation is a minimization of (d2−d1), (d3−d2), and (d4−d3) with respect to variations in x and y.

3. A method for determining the position of four tires on corresponding four wheels in a vehicle, each wheel having an axis of rotation, each tire having an embedded Radio Frequency IDentification (RFID) tag, wherein the RFID tags embedded in the four tires have respective identifiers denoted as ID1, ID2, ID3, and ID4, wherein the axis of the four wheels have (X, Y) coordinates with respect to X and Y axes of a rectangular X-Y coordinate system, wherein the X and Y axes form a plane comprising the axes of the four wheels, and wherein the method comprises:
   determining a position P(x, y) to place a reader antenna subject to x<0 and y>0, wherein (x, y) denotes the (X, Y) coordinates of position P in the X-Y coordinate system;
   placing the reader antenna at the determined position P(x, y);
   after said placing and for z=1, 2, 3, and 4, said reader antenna emitting N signals to the RFID tag whose identifier is IDz and measuring a delay Tzn for receiving the signal n (n=1, 2, . . . , N) reflected from the RFID tag whose identifier is IDz, wherein N is at least 2; and
   identifying which wheel of the four wheels each tire of the four tires is on according to the measured delay Tzn for z=1, 2, 3, and 4 and n=1, 2, . . . , N,
   wherein said identifying comprises determining Tz as a minimum of Tzn (n=1, 2, . . . , N) such that Ta<Tb<Tc<Td, and
   wherein a, b, c, and d are each 1, 2, 3, or 4 and differ from one another.

4. The method of claim 3, wherein the four wheels are a front left wheel (wheel1), a front right wheel (wheel2), a rear left wheel (wheel3), and a rear right wheel (wheel4), and wherein said identifying further comprises identifying the tire having identifier IDa, IDb, IDc, and IDd as being on wheel1, wheel2, wheel3, and wheel4, respectively.

5. The method of claim 1, wherein the RFID tag embedded in a tire of the four tires is a surface acoustic wave RFID tag.

6. The method of claim 1, wherein the RFID tag embedded in a tire of the four tires is passive, semi-passive, or active.

7. The method of claim 1, wherein the RFID tag embedded in a tire of the four tires is a high frequency RFID tag.

8. The method of claim 1, wherein the RFID tag embedded in a tire of the four tires is an ultra high frequency RFID tag.

9. The method of claim 1, wherein the RFID tag embedded in a tire of the four tires includes a sensor.

10. An apparatus for determining the position of four tires on corresponding four wheels in a vehicle, each wheel having an axis of rotation, each tire having an embedded Radio Frequency IDentification (RFID) tag, wherein the RFID tags embedded in the four tires have respective identifiers denoted as ID1, ID2, ID3, and ID4, wherein the axis of the four wheels have (X, Y) coordinates with respect to X and Y axes of a rectangular X-Y coordinate system, wherein the X and Y axes form a plane comprising the axes of the four wheels, and wherein the apparatus comprises:

means for determining a position P(x, y) to place a reader antenna subject to x<0 and y>0, wherein (x, y) denotes the (X, Y) coordinates of position P in the X-Y coordinate system;

means for measuring a delay Tzn for receiving signal n (n=1, 2, . . . , N) reflected from the RFID tag whose identifier is IDz for z=1, 2, 3, and 4 after the reader antenna has been placed at the determined position P(x, y) and has emitted N signals to the RFID tag whose identifier is IDz, wherein N is at least 2; and means for identifying which wheel of the four wheels each tire of the four tires is on according to the measured delay Tzn for z=1, 2, 3, and 4 and n=1, 2, . . . , N, wherein said means for determining the position P(x, y) comprises maximizing a measure of a separation between the position P(x, y) and the four wheels.

11. The apparatus of claim 10, wherein the four wheels are a front left wheel (wheel1), a front right wheel (wheel2), a rear left wheel (wheel3), and a rear right wheel (wheel4), wherein L denotes a distance between wheel1 and wheel3 and is equal to a distance between wheel2 and wheel4, wherein l denotes a distance between wheel1 and wheel2 and is equal to a distance between wheel3 and wheel4, wherein the (X, Y) coordinates on the axis of the four wheel are (−l/2, L/2) for wheel1, (l/2, L/2) for wheel2, (−l/2, −L/2) for wheel3, and (l/2, −L/2) for wheel4, wherein d1, d2, d3, and d4 respectively denote a distance between P(x, y) and the axis of wheel1, wheel2, wheel3, and wheel4 subject to d1<d2<d3<d4, wherein $d1=((x+l/2)^2+(y-L/2)^2)^{1/2}$, $d2=((x-l/2)^2+(y-L/2)^2)^{1/2}$, $d3=((x+l/2)^2+(y+L/2)^2)^{1/2}$, and $d4=((x-l/2)^2+(y+L/2)^2)^{1/2}$, and wherein the measure of the separation is a minimization of (d2−d1), (d3−d2), and (d4−d3) with respect to variations in x and y.

12. An apparatus for determining the position of four tires on corresponding four wheels in a vehicle, each wheel having an axis of rotation, each tire having an embedded Radio Frequency IDentification (RFID) tag, wherein the RFID tags embedded in the four tires have respective identifiers denoted as ID1, ID2, ID3, and ID4, wherein the axis of the four wheels have (X, Y) coordinates with respect to X and Y axes of a rectangular X-Y coordinate system, wherein the X and Y axes form a plane comprising the axes of the four wheels, and wherein the apparatus comprises:

means for determining a position P(x, y) to place a reader antenna subject to x<0 and y>0, wherein (x, y) denotes the (X, Y) coordinates of position P in the X-Y coordinate system;

means for measuring a delay Tzn for receiving signal n (n=1, 2, . . . , N) reflected from the RFID tag whose identifier is IDz for z=1, 2, 3, and 4 after the reader antenna has been placed at the determined position P(x, y) and has emitted N signals to the RFID tag whose identifier is IDz, wherein N is at least 2; and means for identifying which wheel of the four wheels each tire of the four tires is on according to the measured delay Tzn for z=1, 2, 3, and 4 and n=1, 2, . . . , N, wherein said means for identifying comprises means for determining Tz as a minimum of Tzn (n=1, 2, . . . , N) such that Ta<Tb<Tc<Td, and wherein a, b, c, and d are each 1, 2, 3, or 4 and differ from one another.

13. The apparatus of claim 12, wherein the four wheels are a front left wheel (wheel1), a front right wheel (wheel2), a rear left wheel (wheel3), and a rear right wheel (wheel4), and wherein said means for identifying further comprises means for identifying the tire having identifier IDA, IDZ, IDC, and IDZ as being on wheel1, wheel2, wheel3, and wheel4, respectively.

14. The apparatus of claim 12, wherein the RFID tag embedded in a tire of the four tires is a surface acoustic wave RFID tag.

15. The apparatus of claim 12, wherein the RFID tag embedded in a tire of the four tires is passive, semi-passive, or active.

16. The apparatus of claim 12, wherein the RFID tag embedded in a tire of the four tires is a high frequency RFID tag.

17. The apparatus of claim 12, wherein the RFID tag embedded in a tire of the four tires is an ultra high frequency RFID tag.

18. The apparatus of claim 12, wherein the RFID tag embedded in a tire of the four tires includes a sensor.

* * * * *